July 29, 1924.
A. J. NEHRING
1,503,003
DEVICE FOR REMOVING RIND FROM BACON
Filed April 15, 1924
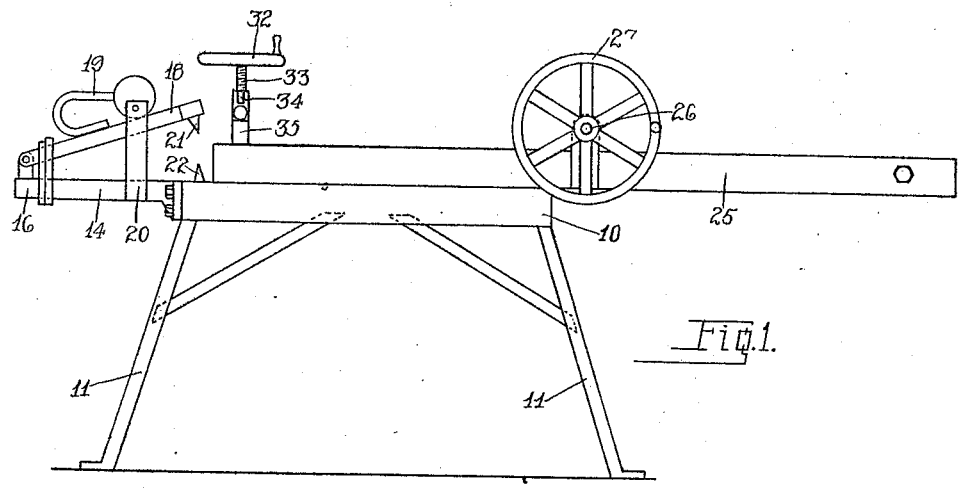
Fig.1.
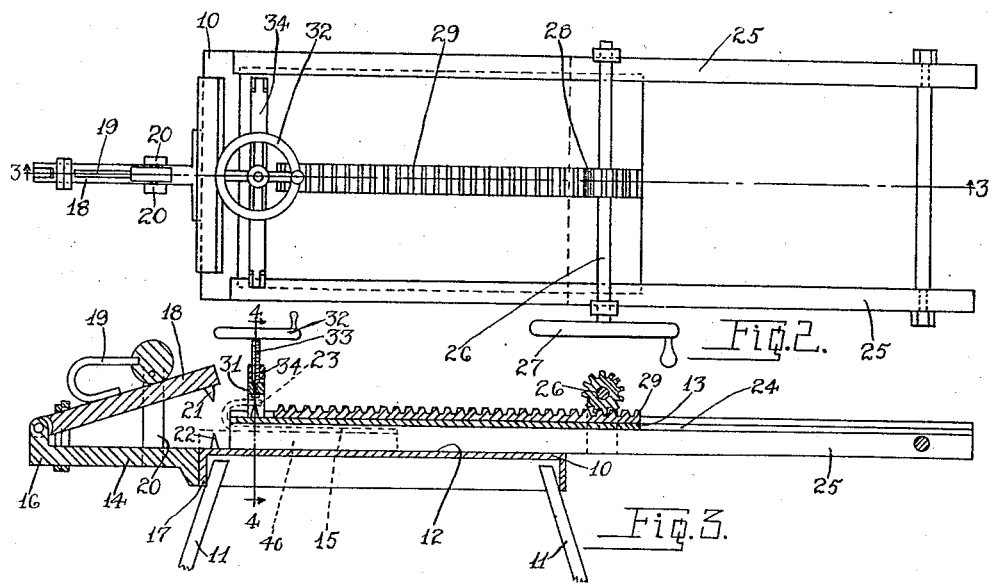
Fig.2.
Fig.3.
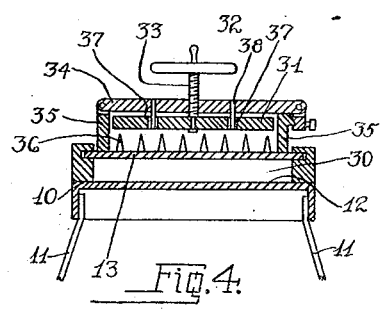
Fig.4.
Inventor
ALFRED J. NEHRING.
By Murray and Guegelter
Attorneys Patented July 29, 1924.

1,503,003

UNITED STATES PATENT OFFICE.

ALFRED J. NEHRING, OF CINCINNATI, OHIO, ASSIGNOR TO THE H. H. MEYER PACKING COMPANY, OF CINCINNATI, OHIO, A CORPORATION OF OHIO.

DEVICE FOR REMOVING RIND FROM BACON.

Application filed April 15, 1924. Serial No. 706,780.

*To all whom it may concern:*

Be it known that I, ALFRED J. NEHRING, a citizen of the United States of America, and a resident of Cincinnati, in the county of Hamilton and State of Ohio, have invented new and useful Improvements in a Device for Removing Rind from Bacon, of which the following is a specification.

My invention is especially adapted for use in removing rind from slabs or sides of smoked bacon and the like preparatory to slicing the bacon, although it is not necessarily restricted to use upon bacon.

An object of my invention is to provide a device for expeditiously removing the rind from bacon.

Another object of my invention is to avoid the loss incident to the former practice of cutting the rind from the bacon.

Another object of my invention is to provide a simple and efficient device for the purpose stated.

These and other objects are attained by the means described herein and disclosed in the accompanying drawings, in which:

Fig. 1 is a side elevation of a device embodying my invention.

Fig. 2 is a plan view of the device shown in Fig. 1.

Fig. 3 is a sectional view on line 3—3 of Fig. 2.

Fig. 4 is a sectional view on line 4—4 of Fig. 3.

My device comprises a table or stand 10 supported by suitable legs 11 and having reciprocally mounted above its upper face 12 a slide or reciprocating table 13. The stationary table 10 is provided at its one end with a clamp 14 whereby to secure one end of a slab or side of bacon 15 upon the table face 12. The clamping means may be of any suitable form and as shown herein comprises a base 16 that is fixedly mounted upon the depending flange 17 formed at the front of the table 10 and which carries a hinged upper jaw 18. An eccentrically mounted spring arm 19 is carried by uprights 20 extending upwardly from the lower jaw 16 and engages the upper face of the pivotally mounted jaw 18 whereby to retain the upper jaw and lower jaw in co-operative clamping relationship. The ends of the jaws adjacent the table may be provided with suitable teeth 21 that may embed themselves in a side of bacon, at one end thereof. As shown herein the teeth 22 are shown as formed on the table 10, however the particular position of the teeth 22 upon the table or upon the clamp is not material. The slide 13 is provided on its upper face with co-operating clamping members for receiving and securing the forward end 23 of the rind of the slab of bacon 15. Previous to mounting the slab 15 upon the table the forward end 23 of the rind would be separated from the edible portion of the slab of bacon in any suitable manner such as by means of a knife. The reciprocating table 13 engages in ways 24 formed in the extensions 25 carried by and extending upwardly from the table 10. The extensions 25 may be in the nature of long bars and revolubly support a transversely extending shaft 26 carrying at its one end a suitable hand wheel 27 and carrying intermediate its ends a spur gear 28. The ways 24 in the sides or extensions 25 form a track in which the movable table 13 may be reciprocated. The table 13 carries on its upper face a rack 29 that engages the spur gear 28. From the foregoing it will be evident that by operating the hand wheel 27 the table 13 may be reciprocated relatively to the table 10. This reciprocation of the table 13 is utilized for separating the rind of the bacon from the edible portion thereof after the forward end 23 of the rind has been secured to the movable table 13 and the edible portion of the bacon has been secured to the fixed table. By reference to Fig. 4 it will be observed that a chamber 30 is formed intermediate the movable and fixed tables for the reception of the bacon. The clamping means for securing the end 23 of the bacon rind upon the movable table may be of any suitable form, for example as disclosed in Fig. 4. The said clamp comprises a reciprocating bar 31 that may be raised and lowered by means of a hand wheel 32 associated with a threaded screw 33 extending through a threaded bore in the cross piece 34 carried by the uprights 35, carried by the reciprocating table 13. The table 13 is provided on its upper face with teeth 36 on which the bacon rind is impinged by means of the reciprocating bar 31. The bar 31 is preferably provided with apertures 37 into which extend pins 38 carried by the cross bar 34 for precluding rotation of the cross bar 31.

In the operation of my device a side or slab of bacon would have the rind at one end thereof severed from the body or edible portion 40 of the bacon. The side of bacon would then be placed upon the table face 12, the severed end 23 of the rind being bent backwardly and the end of the bacon from which the rind had been severed would be secured between the jaws of the clamp 14. The table 13 would then be moved forwardly to such extent that the free end 23 of the rind could be secured to the reciprocating table whereupon the hand wheel 27 would be revolved for moving the reciprocating table rearwardly of the table 10. During such operation the rind would be separated from the body 40 of the bacon 15.

What I claim is:

1. A device of the class described comprising a pair of relatively movable tables, an independent means on each of the tables for fixedly securing different parts of a separable object, and means for moving the tables relatively to one another for separating the different parts of the object.

2. In a device for operation upon meats having a body and a rind the combination of a pair of relatively movable tables, means carried by one of the tables for fixing the body to said table, means carried by the second table for fixedly securing a portion of the rind to said second table, and means for moving the tables relatively to one another for separating the rind and the said body of meat.

3. In a device of the class described the combination of a table, clamping means formed at one end of the table for securing one end of the meat portion of a side of bacon or the like, sides carried by the table and extending upwardly therefrom and disposed at both sides of the clamping means, a second table reciprocally supported by the sides, means carried by the reciprocating table for receiving and clamping the rind or skin of a slab of bacon or the like disposed upon the first mentioned table, a rack extending longitudinally of the reciprocating table, and means carried by the first mentioned table for engagement with the rack for moving the reciprocating table upon the sides whereby to separate the rind from the meat portion of the bacon.

4. A device for operation on meats having a body and a rindlike portion, comprising jaws for gripping the body, jaws for gripping the rindlike portion and means for moving the jaws relative to one another for separating the body and the rindlike portion.

In testimony whereof, I have hereunto subscribed my name this 9th day of April, 1924.

ALFRED J. NEHRING